US012768477B2

(12) United States Patent
Sugiyama et al.

(10) Patent No.: US 12,768,477 B2
(45) Date of Patent: Oct. 20, 2026

(54) MULTI-CYLINDRICAL STRUCTURE SUPPLY PIPE

(71) Applicant: SUBARU CORPORATION, Tokyo (JP)

(72) Inventors: Shota Sugiyama, Tokyo (JP); Pei Pei, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 548 days.

(21) Appl. No.: 18/231,527

(22) Filed: Aug. 8, 2023

(65) Prior Publication Data

US 2024/0068600 A1 Feb. 29, 2024

(30) Foreign Application Priority Data

Aug. 31, 2022 (JP) ................................ 2022-138382

(51) Int. Cl.
*B60L 50/72* (2019.01)
*B60L 53/57* (2019.01)
(Continued)

(52) U.S. Cl.
CPC .................. *F16L 9/20* (2013.01); *F16L 9/18* (2013.01); *H02G 3/0481* (2013.01)

(58) Field of Classification Search
CPC ....... F16L 9/20; F16L 9/19; F16L 9/18; F16L 9/14; F16L 9/147; F16L 9/04; F16L 9/06; F16L 11/00; F16L 11/04; F16L 11/08; F16L 11/11; F16L 9/125; F16L 9/123; F16L 9/121; F16L 11/12; F16L 11/127; F16L 11/20; F16L 11/22; F16L 59/143; B60L 53/18; B60L 53/14; B60L 53/54;
(Continued)

(56) References Cited

U.S. PATENT DOCUMENTS 4,014,369 A * 3/1977 Kobres, Jr. ........... F16L 59/141 138/112
5,125,691 A * 6/1992 Bogdan .................. E21B 17/18 285/123.6

(Continued)

FOREIGN PATENT DOCUMENTS

JP H11-178241 A 7/1999
JP 2006-325392 A 11/2006

*Primary Examiner* — Craig M Schneider
*Assistant Examiner* — Joshua D Leary
(74) *Attorney, Agent, or Firm* — MCGINN INTELLECTUAL PROPERTY LAW GROUP, PLLC

(57) ABSTRACT

A multi-cylindrical structure supply pipe includes at least three concentric pipes that couple a stationary fuel cell system that is stationary and an in-vehicle fuel cell system mounted on a fuel cell vehicle. The at least three concentric pipes include a hydrogen supply pipe, a liquid circulation pipe, and an electric wire pipe. The hydrogen supply pipe is configured to allow hydrogen gas to flow through the hydrogen supply pipe. The liquid circulation pipe surrounds an outer periphery of the hydrogen supply pipe. The liquid circulation pipe is configured to allow liquid to flow through the liquid circulation pipe outside the hydrogen supply pipe. The electric wire pipe surrounds an outer periphery of the liquid circulation pipe. The electric wire pipe is provided with one or more electric wires outside the liquid circulation pipe.

16 Claims, 4 Drawing Sheets

(51) Int. Cl.

| | |
|---|---|
| ***B60L 55/00*** | (2019.01) |
| ***F16L 9/18*** | (2006.01) |
| ***F16L 9/19*** | (2006.01) |
| ***H02G 3/04*** | (2006.01) |

(58) Field of Classification Search

CPC .......... B60L 55/00; B60L 53/16; B60L 53/57; B60L 53/302; H01M 8/04; H01M 8/04119; H02G 3/0841; B64D 37/00; B64D 37/16; B64D 37/14; B64D 37/30

USPC .......................................................... 138/140

See application file for complete search history.

(56) References Cited

U.S. PATENT DOCUMENTS

| | | | | |
|---|---|---|---|---|
| 6,107,691 | A * | 8/2000 | Gore | H02P 9/04 290/1 R |
| 6,745,796 | B2 * | 6/2004 | Ikemoto | B32B 25/10 138/140 |
| 10,982,797 | B1 * | 4/2021 | Callahan | F16L 11/20 |
| 2009/0026841 | A1 | 1/2009 | Nakanishi | |
| 2010/0313987 | A1 * | 12/2010 | Salama | F16L 9/18 138/148 |
| 2015/0054460 | A1 * | 2/2015 | Epstein | B60L 58/27 320/109 |
| 2017/0355245 | A1 * | 12/2017 | Bergweiler | B60H 1/00314 |
| 2019/0217707 | A1 * | 7/2019 | Reber | B60L 5/02 |
| 2024/0317979 | A1 * | 9/2024 | Mizutani | C08K 5/0016 |

* cited by examiner

MULTI-CYLINDRICAL STRUCTURE SUPPLY PIPE

CROSS-REFERENCE TO RELATED APPLICATIONS

The present application claims priority from Japanese Patent Application No. 2022-138382 filed on Aug. 31, 2022, the entire contents of which are hereby incorporated by reference.

BACKGROUND

The disclosure relates to a multi-cylindrical structure supply pipe suitable for a power supply system that includes a fuel cell vehicle and a stationary fuel cell system.

A fuel cell system to be installed in a home, a factory, or the like, which is also commonly referred to as ENE-FARM (registered trademark), is known. In this household fuel cell system, electric power is generated via a stationary fuel cell by using hydrogen produced from fuel such as city gas or LP gas, and oxygen in the air.

For the stationary fuel cell system, for example, a power supply system is proposed to which a fuel cell vehicle or an electric vehicle is coupled for power supply during a power outage. For example, Japanese Unexamined Patent Application Publication (JP-A) No. H11-178241 discloses a configuration in which power is supplied to household electric devices using a battery of an electric vehicle during a power outage. Further, Japanese Unexamined Patent Application Publication (JP-A) No. 2006-325392 proposes a power supply system capable of efficiently supplying electric power to household electric devices during a power outage in cooperation with a vehicle, which includes a unit for supplying electric power to an outside of the vehicle, and a stationary fuel cell system.

SUMMARY

An aspect of the disclosure provides a multi-cylindrical structure supply pipe. The multi-cylindrical structure supply pipe includes at least three concentric pipes that couple a stationary fuel cell system that is stationary and an in-vehicle fuel cell system mounted on a fuel cell vehicle. The pipes at least three concentric include a hydrogen supply pipe, a liquid circulation pipe, and an electric wire pipe. The hydrogen supply pipe is configured to allow hydrogen gas to flow through the hydrogen supply pipe. The liquid circulation pipe surrounds an outer periphery of the hydrogen supply pipe. The liquid circulation pipe is configured to allow liquid to flow through the liquid circulation pipe outside the hydrogen supply pipe. The electric wire pipe surrounds an outer periphery of the liquid circulation pipe. The electric wire pipe is provided with one or more electric wires outside the liquid circulation pipe.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Current technologies, which are not limited to the above-described JP-A No. H11-178241 and JP-A No. 2006-325392, do not satisfy market demands, and have problems to be described below. That is, a fuel cell vehicle including a power generation mechanism similar to a stationary fuel cell system has a high affinity with a power supply system including the stationary fuel cell system. However, in the related art including JP-A No. 2006-325392, which kind of pipe structure is to be used between the fuel cell vehicle and the stationary fuel cell system to supply hydrogen or electric power from one to the other is not clarified in one example, and there is room for improvement at least in this aspect.

It is desirable to provide a multi-cylindrical structure supply pipe capable of efficiently supplying hydrogen, electric power, or the like from one of a fuel cell vehicle and a stationary fuel cell system to the other.

The accompanying drawings are included to provide a further understanding of the disclosure and are incorporated in and constitute a part of this specification. The drawings illustrate embodiments and, together with the specification, serve to describe the principles of the disclosure.

Configurations other than those to be described in detail below may be implemented while appropriately complementing technologies or configurations of elements that are related to known stationary fuel cell systems or fuel cell vehicles including JP-A No. H11-178241 and JP-A No. 2006-325392.

Power Supply System 500

Figure 1:
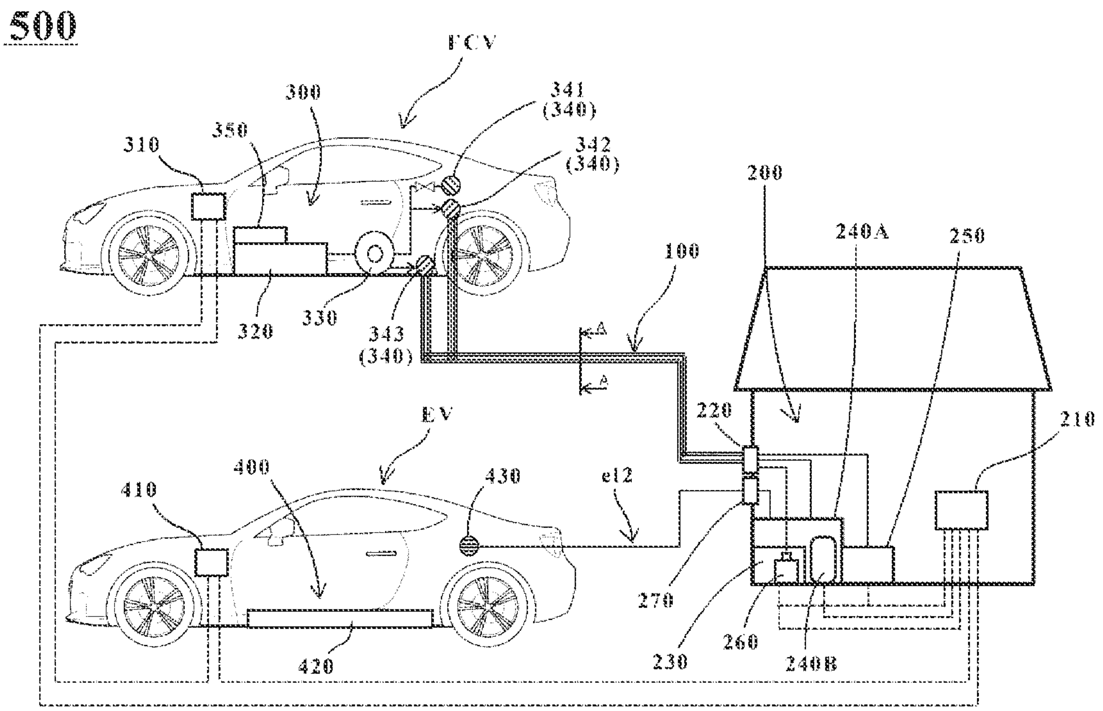
FIG. 1 is a schematic diagram illustrating a power supply system according to an embodiment.

FIG. 1 schematically illustrates a power supply system 500 in the present embodiment. As understood from FIG. 1, the power supply system 500 includes a stationary fuel cell system 200 installed in a home, a factory, or the like; an in-vehicle fuel cell system 300 that is mounted on a fuel cell vehicle FCV and can be coupled to the stationary fuel cell system 200 via a multi-cylindrical structure supply pipe 100; and an EV power supply system 400 that is mounted on an electric vehicle EV and can be coupled to the stationary fuel cell system 200 via a known power supply line el2.

Stationary Fuel Cell System 200

Figure 2:
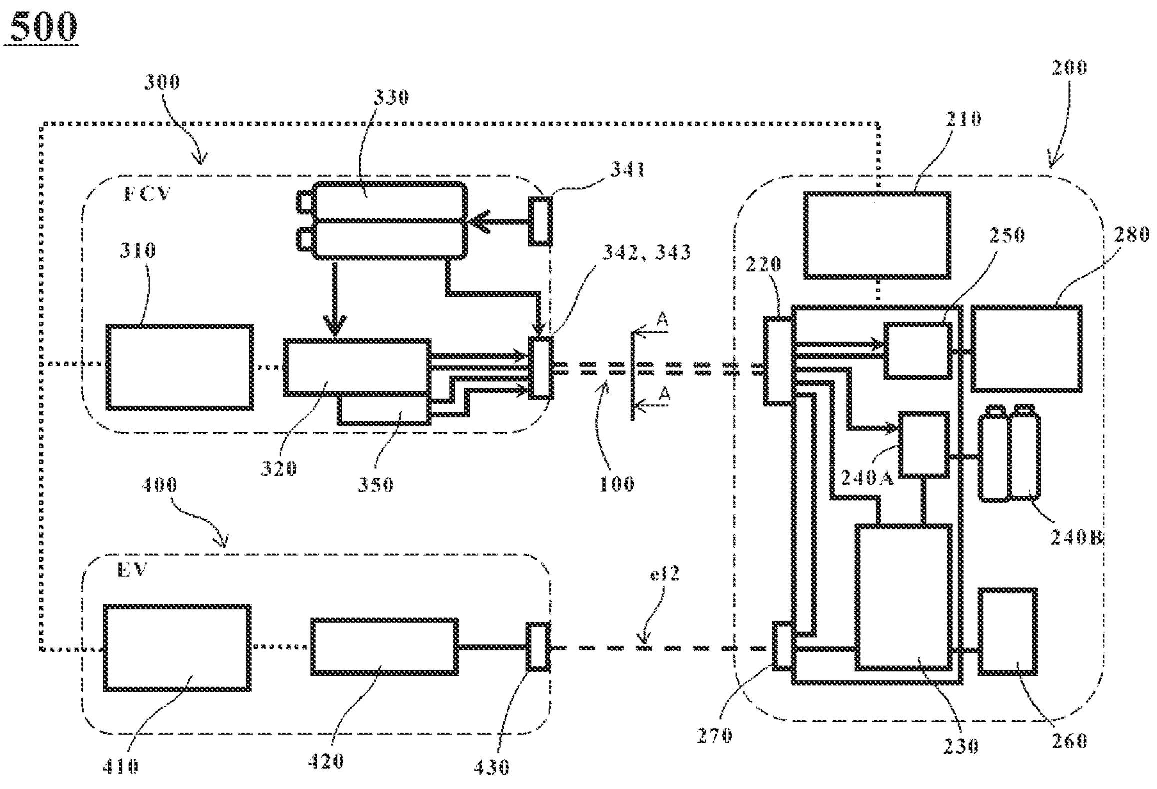
FIG. 2 is a schematic diagram illustrating function blocks of the power supply system according to the embodiment.

Next, referring to FIGS. 1 and 2, a configuration and a function of the stationary fuel cell system 200 will be described. FIG. 2 is a schematic diagram illustrating function blocks of the power supply system 500 according to the embodiment.

As understood from FIGS. 1 and 2, the stationary fuel cell system 200 includes a first control device 210, a first terminal block 220, a power conditioner 230, a stationary fuel cell unit 240A, a fuel gas tank 240B, a hot water storage tank 250, a storage battery 260, a second terminal block 270, and a hot water supply device 280.

The stationary fuel cell system 200 includes a household fuel cell cogeneration system, which is also referred to as ENE-FARM (registered trademark), and may be installed in, for example, an ordinary home. Hereinafter, the stationary fuel cell system 200 as the ENE-FARM (registered trademark) will be described as an example. However, the stationary fuel cell system 200 in the present embodiment may be installed in another house, such as a factory, in addition to the ordinary home.

The first control device 210 has a function of controlling drive of the power conditioner 230, the stationary fuel cell unit 240A, or the like, which will be described later. In one example, as the first control device 210 according to the present embodiment, a known computer can be applied which includes one or multiple processors (Central Processing Unit (CPU)) and one or multiple memories communicably coupled to the one or multiple processors.

The first terminal block 220 is a coupling terminal coupled with an end of the multi-cylindrical structure supply pipe 100 to be described later. Since hydrogen and circulating water are supplied through the multi-cylindrical structure supply pipe 100 provided with insulated electric wires, the first terminal block 220 distributes the hydrogen and the circulating water independently to necessary locations in the stationary fuel cell system 200. A specific structure of the first terminal block 220 is not limited to one example as long as the above functions are exhibited, and a pipe coupling structure known in JP-A No. 2004-085372 which discloses a double pipe structure, JP-A No. 2003-279435 which discloses a multi-pipe structure, or the like may be applied.

The power conditioner 230 is, for example, a known power conditioner having a function of converting DC power generated in the stationary fuel cell unit 240A into AC power and supplying the AC power to household electric facilities. In addition, the power conditioner 230 in the present embodiment may have a function of converting DC power supplied from the fuel cell vehicle FCV via the multi-cylindrical structure supply pipe 100 into AC power and supplying the AC power to the household electric facilities.

The stationary fuel cell unit 240A is a known stationary fuel cell unit installed in a home, a factory, or the like. Examples of the stationary fuel cell unit 240A can include a known fuel cell unit applied to ENE-FARM (registered trademark) described above.

Similarly, examples of the fuel gas tank 240B, the hot water storage tank 250, the storage battery 260, and the hot water supply device 280 can also include known units that can be applied to ENE-FARM (registered trademark) described above.

The second terminal block 270 is a known terminal block that can be coupled to a power supply line of the electric vehicle EV. Examples of the second terminal block 270 can include a known terminal block applied to known plug-in hybrid vehicles or electric vehicles. Accordingly, for example, the first control device 210 can control a supply of electric power, which is necessary for the storage battery 260 or the household electric facilities, from the electric vehicle EV coupled by the power supply line el2 via the second terminal block 270 and the power conditioner 230.

In-Vehicle Fuel Cell System 300

Figure 3:
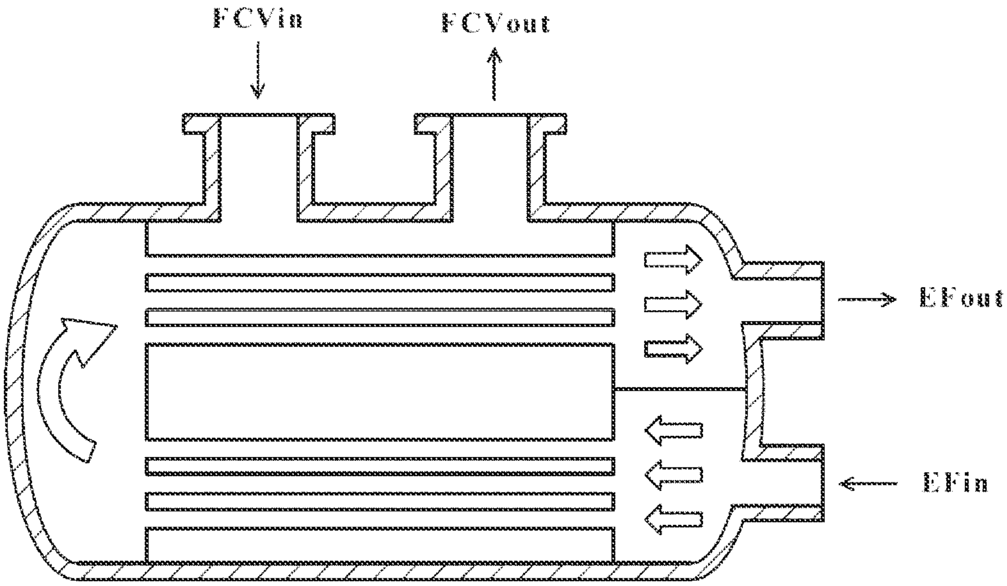
FIG. 3 is a schematic diagram illustrating an example of a heat exchanger mounted on a fuel cell vehicle according to the embodiment.

Next, referring to FIGS. 1 to 3, a configuration and a function of the in-vehicle fuel cell system 300 will be described. As understood from FIGS. 1 to 3, the in-vehicle fuel cell system 300 in the present embodiment includes a second control device 310, a fuel cell stack 320, a fuel gas tank 330, external coupling ports 340, and a heat exchanger 350. In addition to the in-vehicle fuel cell system 300, the fuel cell vehicle FCV in the present embodiment may include components for a known fuel cell vehicle, such as an auxiliary battery, a high-voltage battery, and a DC/DC converter.

The second control device 310 has, for example, a function of controlling the fuel cell stack 320. In one example, the second control device 310 according to the present embodiment is implemented by a computer including one or multiple processors (Central Processing Unit (CPU)), and one or multiple memories communicably coupled to the one or multiple processors. The second control device 310 may be implemented as one of known electronic control units (ECU) mounted on a fuel cell vehicle.

The fuel cell stack 320 is a known fuel cell unit mounted on the fuel cell vehicle FCV. Examples of the fuel gas tank 330 can include a known hydrogen tank mounted on the fuel cell vehicle FCV.

The external coupling ports 340 include a fuel filling port 341 and one of a second coupling port 342 and a third coupling port 343. Among these, the fuel filling port 341 is a known filling port for supplying high-pressure hydrogen supplied from a known hydrogen station to the fuel gas tank 330 via an in-vehicle pressure reduction valve or the like.

The second coupling port 342 and the third coupling port 343 are terminal blocks having a structure similar to that of the first terminal block 220. The hydrogen, the circulating water, and the like supplied via the multi-cylindrical structure supply pipe 100 are distributed, independently in the first terminal block 220, to necessary locations in the fuel cell vehicle FCV.

Among these, the second coupling port 342 is provided in the fuel cell vehicle FCV separately from the fuel filling port 341. The hydrogen supplied from the fuel cell vehicle FCV to the stationary fuel cell system 200 may be, for example, branched downstream of the pressure reduction valve of the fuel filling port 341 and supplied to the second coupling port 342.

The third coupling port 343 may use, for example, a known hydrogen discharge port provided in the fuel cell vehicle FCV. In such a case, the hydrogen is discharged from the fuel gas tank 330, for example, in an emergency, from the hydrogen discharge port, and the hydrogen is supplied to the stationary fuel cell system 200 from the third coupling port 343 via the multi-cylindrical structure supply pipe 100 as necessary.

The heat exchanger 350 has a function of performing heat exchange between liquid (tap water as an example) supplied from the stationary fuel cell system 200 via the multi-cylindrical structure supply pipe 100 and cooling water heated by the fuel cell stack 320. In one example, as illustrated in FIG. 3, the cooling water heated by cooling the fuel cell stack 320 on a fuel cell vehicle FCV side flows into the heat exchanger 350 from a first inflow port FCVin. On the other hand, the liquid supplied from the stationary fuel cell system 200 flows in from a second inflow port EFin of the heat exchanger 350.

The cooling water flowing into the heat exchanger 350 from the first inflow port FCVin in this manner exchanges heat with the liquid supplied from the stationary fuel cell system 200 to cool be cooled, and then the cooling water flows out from a first outflow port FCVout of the heat exchanger 350.

On the other hand, the liquid supplied from the stationary fuel cell system 200 flows out from a second outflow port EFout of the heat exchanger 350 after being heated by exchanging heat with the heated cooling water in the heat exchanger 350. The liquid that flows out from the second outflow port EFout recirculates to the stationary fuel cell system 200 (for example, the hot water storage tank 250 or the hot water supply device 280) via the multi-cylindrical structure supply pipe 100.

EV Power Supply System 400

Next, referring to FIGS. 1 and 2, a configuration and a function of the EV power supply system 400 will be described. As understood from FIGS. 1 and 2, the EV power supply system 400 in the present embodiment includes a third control device 410, a high-capacity battery 420, and a third terminal block 430. In addition to the EV power supply system 400, the electric vehicle EV in the present embodiment may include known components for the electric vehicle, such as an auxiliary battery or a DC/DC converter.

The third control device 410, for example, has a function of controlling charging and discharging in the high-capacity battery 420. In one example, the third control device 410 according to the present embodiment is implemented by a computer including one or multiple processors (Central Processing Unit (CPU)), and one or multiple memories communicably coupled to the one or multiple processors. The third control device 410 may be implemented as one of a known electronic control unit (ECU) and a cell management unit (CMU) that are mounted on an electric vehicle.

Under control of the third control device 410, the high-capacity battery 420 supplies electric power necessary for driving the electric vehicle EV and electric power necessary for the stationary fuel cell system 200. As the high-capacity battery 420, various known secondary batteries such as a lithium-ion secondary battery can be applied.

The third terminal block 430 is a known terminal block that can be coupled to the power conditioner 230 or the storage battery 260 of the stationary fuel cell system 200 via the power supply line el2. Examples of the third terminal block 430 can include a known terminal block applied to a known plug-in hybrid vehicle or electric vehicle.

As described above, the electric vehicle EV in the present embodiment includes the high-capacity battery 420 having a capacity higher than that of the fuel cell vehicle FCV. Therefore, by cooperating with the first control device 210 and the second control device 310, the third control device 410 can also store electric power generated in the fuel cell stack 320 of the fuel cell vehicle FCV into the high-capacity battery 420 via the stationary fuel cell system 200.

By cooperating with the first control device 210 and the second control device 310, the third control device 410 can supply the electric power necessary for the fuel cell vehicle FCV or the stationary fuel cell system 200 from the high-capacity battery 420. In other words, in the power supply system 500 according to the present embodiment, the electric power is stored in the high-capacity battery 420 of the electric vehicle EV having the largest storage capacity, and thus the electric power generated in the stationary fuel cell system 200 or the fuel cell vehicle FCV can be efficiently stored without being wasted. Accordingly, valuable electric power can also be secured and efficiently used, for example, in a disaster or during a power outage.

Multi-Cylindrical Structure Supply Pipe 100

Next, the multi-cylindrical structure supply pipe 100 in the present embodiment will be described in detail. The multi-cylindrical structure supply pipe 100 according to the present embodiment includes at least three concentric pipes (in which openings in the pipes have substantially the same center) that couple the stationary fuel cell system 200 that is stationary and the in-vehicle fuel cell system 300 mounted on the fuel cell vehicle FCV.

Figure 4:
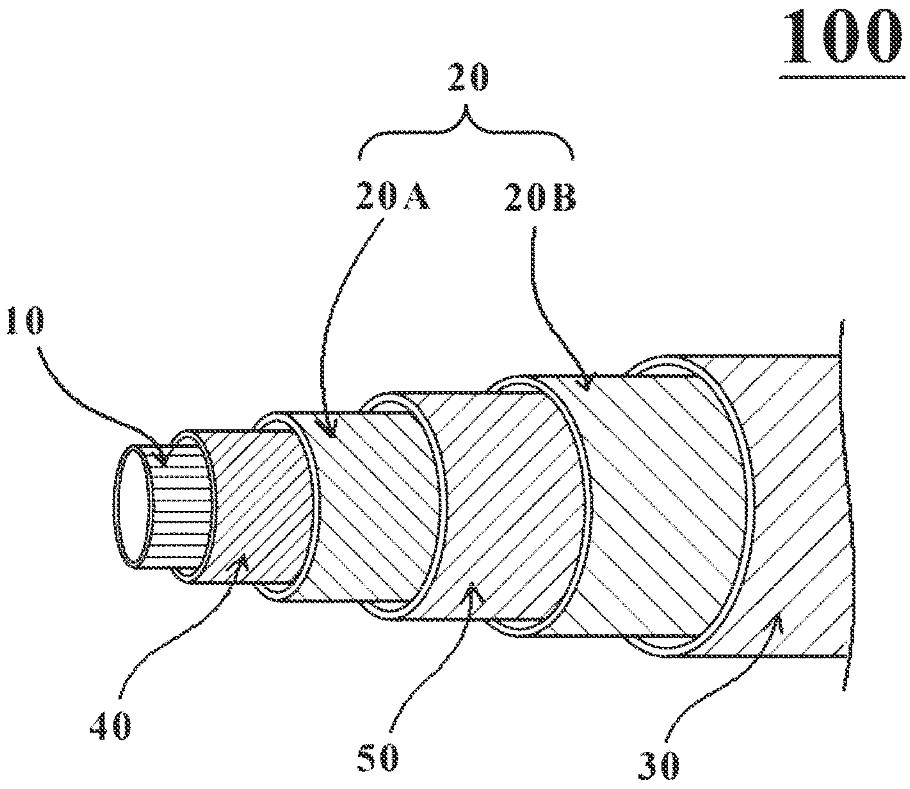
FIG. 4 is a schematic diagram illustrating a layered structure of a multi-cylindrical structure supply pipe according to the embodiment.
Figure 5:
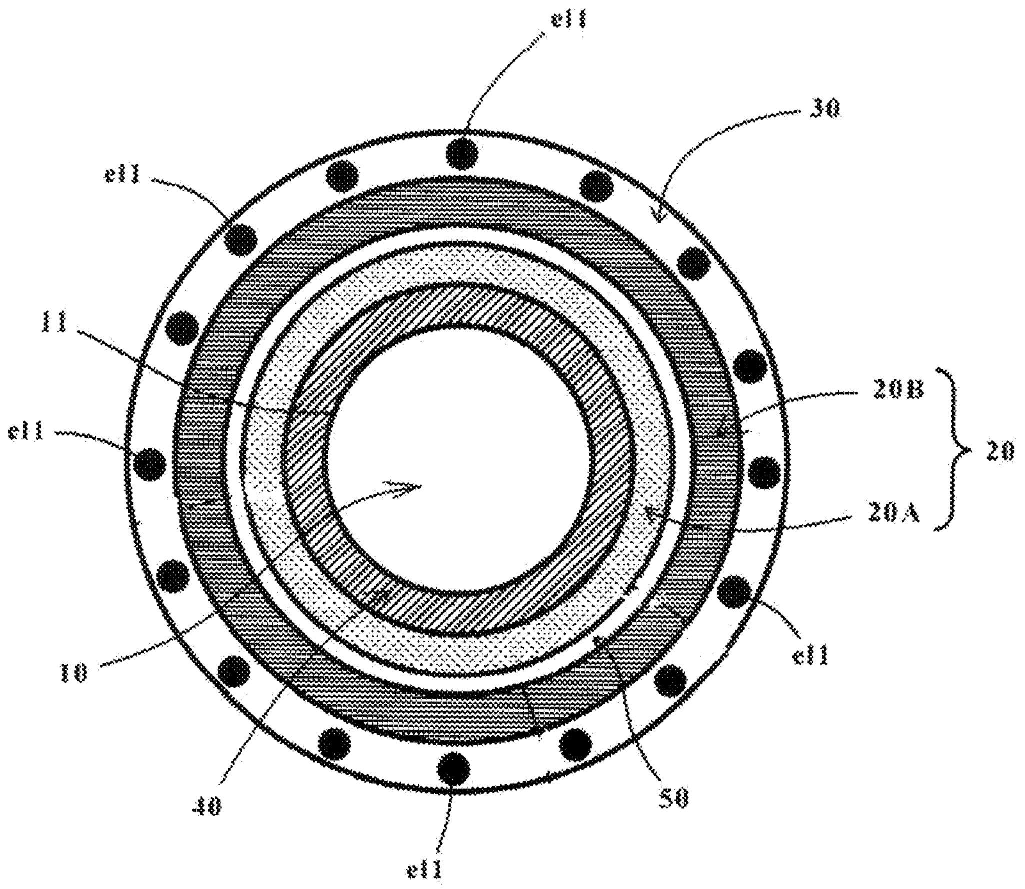
FIG. 5 is a cross-sectional view of the multi-cylindrical structure supply pipe according to the embodiment.

In one example, as illustrated in FIGS. 4 and 5, the multi-cylindrical structure supply pipe 100 according to the present embodiment has a function of coupling the stationary fuel cell system 200 and the in-vehicle fuel cell system 300 so as to allow gas, liquid, or the like to reciprocate as necessary, and includes at least a hydrogen supply pipe 10, a liquid circulation pipe 20, and an electric wire pipe 30.

As understood from the figures, the hydrogen supply pipe 10 is disposed at the innermost position in the multi-cylindrical structure supply pipe 100 and has a function of allowing the hydrogen gas to flow therethrough. As a material of a pipe wall 11 in the hydrogen supply pipe 10, for example, a known hydrogen supply pipe formed of, for example, a resin layer including a metal reinforcement layer may be applied.

As illustrated in FIG. 5 and the like, in the multi-cylindrical structure supply pipe 100 according to the present embodiment, a first reinforcement layer 40 made of a first metal material may be further provided between the hydrogen supply pipe 10 and the liquid circulation pipe 20. As the first reinforcement layer 40, for example, a wire material of a known metal such as copper, aluminum, or a general steel material may be applied. Since being interposed between the hydrogen supply pipe 10 and the liquid circulation pipe 20, the first reinforcement layer 40 further strengthens the pipe wall of the hydrogen supply pipe 10 and prevents leakage from the liquid circulation pipe 20.

When the hydrogen supply pipe 10 itself has a reinforced structure having sufficient pressure resistance (for example, pressure resistance of approximately several MPa), the first reinforcement layer 40 in the multi-cylindrical structure supply pipe 100 may be appropriately omitted.

As illustrated in FIG. 4 and the like, the liquid circulation pipe 20 surrounds an outer periphery of the hydrogen supply pipe 10, and has a function of allowing liquid to flow therethrough outside the hydrogen supply pipe 10. In some embodiments, as understood from FIG. 5, the liquid circulation pipe 20 according to the present embodiment includes a first reciprocating circulation water pipe 20A that allows liquid to flow from the stationary fuel cell system 200 to the fuel cell vehicle FCV, and a second reciprocating circulation water pipe 20B that is provided concentrically with respect to the first reciprocating circulation water pipe 20A and that allows liquid to flow from the fuel cell vehicle FCV to the stationary fuel cell system 200. Accordingly, for example, the liquid (tap water, cold water) supplied from the stationary fuel cell system 200 flows to the heat exchanger 350 of the fuel cell vehicle FCV through the first reciprocating circulation water pipe 20A, and the heated liquid after heat exchange recirculates to the stationary fuel cell system 200 through the second reciprocating circulation water pipe 20B.

As illustrated in FIG. 5 and the like, in the multi-cylindrical structure supply pipe 100 according to the present embodiment, a second reinforcement layer 50 made of a second metal material may be further provided between the first reciprocating circulation water pipe 20A and the second reciprocating circulation water pipe 20B. As the second metal material, various known metal materials such as aluminum, stainless steel, or lead can be applied.

In the second reinforcement layer 50 according to the present embodiment, for example, metal wiring to which a predetermined current can be applied under control of one or more of the first control device 210 and the second control device 310 may be embedded. In this manner, the metal wiring to which the current can be applied is embedded in the second reinforcement layer 50, and thus the second reinforcement layer 50 has a temperature regulating function. Therefore, for example, the second control device 310 may control application of the predetermined current to the metal wiring in the second reinforcement layer 50, based on an external temperature measured by, for example, a temperature sensor (not illustrated).

Accordingly, an anti-freezing function of a liquid pipe in a low-temperature environment, such as winter, is imparted to the second reinforcement layer 50, and freezing of the liquid in the liquid circulation pipe 20 in the low-temperature environment, such as winter, is prevented. Therefore, in some embodiments, the second metal material is a material different from the first metal material and has electric resistance higher than that of the first metal material when the second reinforcement layer 50 has the anti-freezing function.

Further, in the present embodiment, a known heat insulating layer may be provided on a side of the second reinforcement layer 50 in contact with the liquid circulation pipe 20 (a first reciprocating circulation water pipe 20A side in the present example) through which cold water flows. In other words, the heat insulating layer may be interposed between the first reciprocating circulation water pipe 20A and the second reciprocating circulation water pipe 20B. As the heat insulating layer, for example, a known resin material having a heat insulating property such as vinyl chloride or phenol resin can be applied.

As illustrated in FIG. 5 and the like, the electric wire pipe 30 surrounds an outer periphery of the liquid circulation pipe 20, and one or multiple electric wires el1 are provided outside the liquid circulation pipe 20. Although the multiple electric wires el1 are provided in a circumferential direction in the electric wire pipe 30 in the figures, a single electric wire el1 may be provided. Various known insulating materials such as epoxy resin or silicone rubber may be used to fill between the multiple electric wires el1 inside the electric wire pipe 30.

The electric wires el1 in the electric wire pipe 30 according to the present embodiment are configured to electrically couple, for example, an in-vehicle battery (not illustrated) or the fuel cell stack 320 in the fuel cell vehicle FCV, and the power conditioner 230 or the storage battery 260 in the stationary fuel cell system 200. Accordingly, the first control device 210 or the second control device 310 can supply the electric power obtained, for example, in the fuel cell stack 320 of the fuel cell vehicle FCV to the stationary fuel cell system 200 via the electric wires el1 in the electric wire pipe 30. Further, the first control device 210 or the second control device 310 may control, for example, a necessary supply of the electric power from the storage battery 260 of the stationary fuel cell system 200 to the fuel cell vehicle FCV via the electric wires el1 in the electric wire pipe 30.

Operation Method of Power Supply System

Figure 6:
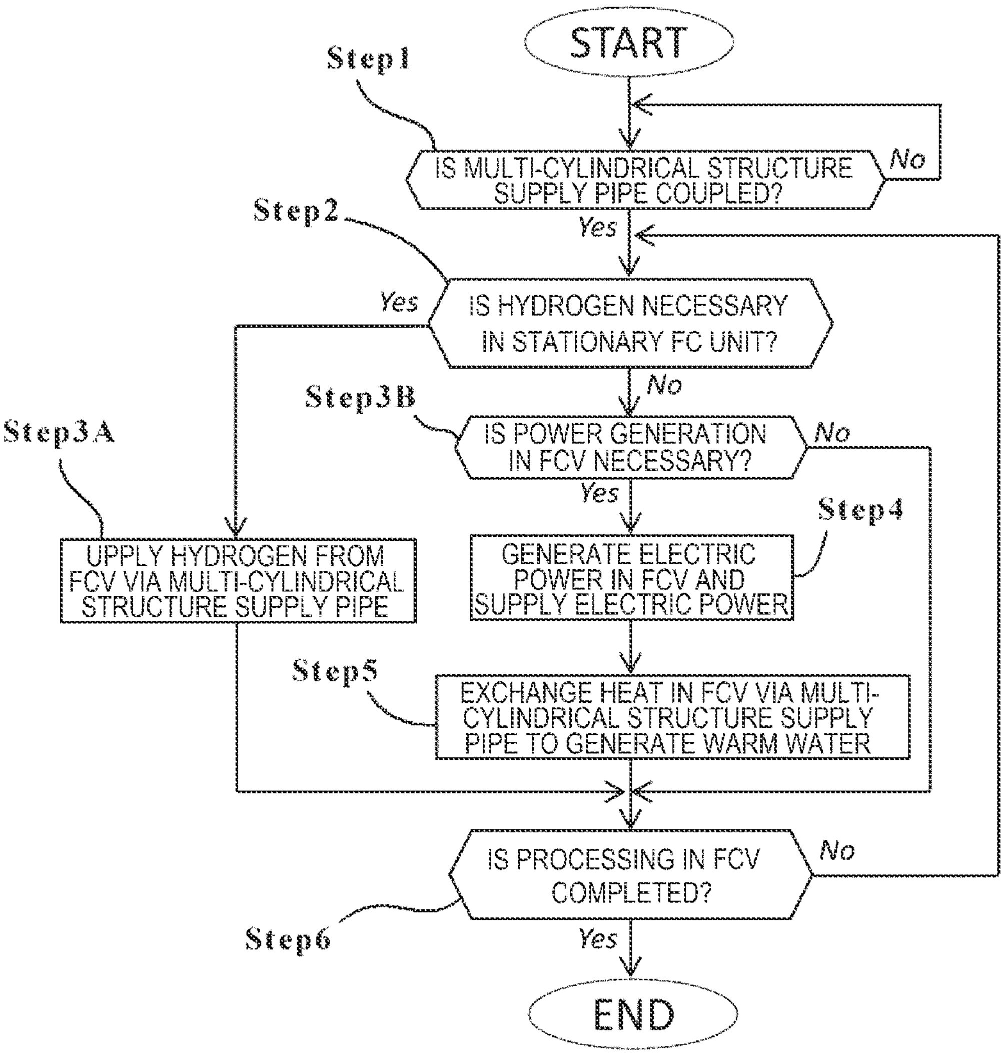
FIG. 6 is a flowchart illustrating an operation method of the power supply system according to the embodiment.

Next, an example of an operation method of the power supply system 500 using the multi-cylindrical structure supply pipe 100 according to the present embodiment will be described with reference to FIG. 6. The operation method to be described below is performed by one or more of the first control device 210 and the second control device 310. At this time, when one of the first control device 210 and the second control device 310 serves as a main control device to integrate the operation method and perform control, the other control device serves as a sub-control device. Hereinafter, a case where the first control device 210 serves as the main control device will be described as an example.

That is, a user who uses the multi-cylindrical structure supply pipe 100 couples the stationary fuel cell system 200 and the fuel cell vehicle FCV using the multi-cylindrical structure supply pipe 100. Then, in step 1, it is detected whether the multi-cylindrical structure supply pipe 100 is coupled to both the stationary fuel cell system 200 and the fuel cell vehicle FCV.

When it is determined in step 1 that the multi-cylindrical structure supply pipe 100 is coupled to both the stationary fuel cell system 200 and the fuel cell vehicle FCV, in next step 2, it is determined whether hydrogen is necessary in the stationary fuel cell unit 240A via the fuel cell vehicle FCV. At this time, for example, when a hydrogen supply from the fuel gas tank 240B is interrupted in a disaster such as an earthquake, the first control device 210 may determine that hydrogen is necessary in the stationary fuel cell unit 240A via the fuel cell vehicle FCV.

Then, when it is determined that hydrogen is necessary in the stationary fuel cell unit 240A via the fuel cell vehicle FCV in step 2, for example, the first control device 210 controls a supply of hydrogen from the fuel cell vehicle FCV to the stationary fuel cell system 200 via the multi-cylindrical structure supply pipe 100 in following step 3A. Accordingly, even when hydrogen cannot be supplied from the fuel gas tank 240B to the stationary fuel cell unit 240A for some reason, the stationary fuel cell unit 240A can be operated.

On the other hand, when it is determined that hydrogen is unnecessary in the stationary fuel cell unit 240A via the fuel cell vehicle FCV in step 2, it is determined whether power generation in the fuel cell vehicle FCV is necessary in following step 3B. At this time, for example, when rapid charge in the storage battery 260 is necessary or when storage of electric power in the electric vehicle EV is necessary, the first control device 210 may determine that power generation in the fuel cell vehicle FCV is necessary.

When it is determined that power generation in the fuel cell vehicle FCV is necessary in step 3B, for example, the first control device 210 controls, in cooperation with the second control device 310, an operation of the fuel cell stack 320 in the fuel cell vehicle FCV so as to generate electric power in following step 4. At the same time, the first control device 210 controls a supply of the electric power generated in the fuel cell stack 320 to a desired device (such as the power conditioner 230 or the high-capacity battery 420 of the electric vehicle EV) via the multi-cylindrical structure supply pipe 100.

Further, in following step 5, the first control device 210 controls a supply of liquid (tap water) from the stationary fuel cell system 200 to the heat exchanger 350 of the fuel cell vehicle FCV via the multi-cylindrical structure supply pipe 100. Accordingly, the liquid (tap water) supplied from the stationary fuel cell system 200 becomes warm water by being heat-exchanged in the heat exchanger 350, and recirculates to the stationary fuel cell system 200 via the multi-cylindrical structure supply pipe 100 again so as to be stored in the hot water storage tank 250 or the like.

Then, in step 6, the first control device 210 determines whether processing in the fuel cell vehicle FCV is completed. When it is determined in step 6 that all the processing in the fuel cell vehicle FCV is completed, the operation method according to the present embodiment ends. On the other hand, when it is determined in step 6 that not all the processing in the fuel cell vehicle FCV is completed, the method returns to step 2 and the above-described processing is performed again.

In this manner, according to the multi-cylindrical structure supply pipe, the power supply system, and the operation method thereof in the present embodiment, it is possible to efficiently supply necessary hydrogen and electric power from one of the fuel cell vehicle and the stationary fuel cell system to the other using one pipe structure.

The above embodiment is an example of the disclosure, and each element in the embodiment can be appropriately combined to implement a new structure or new control without departing from the gist of the disclosure. It is evident that those having ordinary knowledge in the technical field to which the disclosure belongs can conceive of various changes or modifications within the scope of the technical concept described in the claims, and it is understood that these changes or modifications also fall within the technical scope of the disclosure.

For example, in the above embodiment, in the multi-cylindrical structure supply pipe 100, the liquid having a relatively low temperature flows through the first reciprocating circulation water pipe 20A, and the heated liquid after heat exchange flows through the second reciprocating circulation water pipe 20B. However, the disclosure is not limited to the above embodiment, and the liquid having a relatively low temperature may flow through the second reciprocating circulation water pipe 20B while the liquid having a relatively high temperature may flow through the first reciprocating circulation water pipe 20A.

The invention claimed is:

1. A multi-cylindrical structure supply pipe comprising:

at least three concentric pipes that couple a stationary fuel cell system that is stationary and an in-vehicle fuel cell system mounted on a fuel cell vehicle, wherein the at least three concentric pipes comprise:

a hydrogen supply pipe configured to allow hydrogen gas to flow through the hydrogen supply pipe, a first reciprocating circulation water pipe surrounding an outer periphery of the hydrogen supply pipe, the first reciprocating circulation water pipe being configured to allow liquid to flow through the first reciprocating circulation water pipe outside the hydrogen supply pipe from the fuel cell system to the in-vehicle fuel cell system, a second reciprocating circulation water pipe surrounding an outer periphery of the first reciprocating circulation water pipe, the second reciprocating circulation water pipe being configured to allow the liquid to flow through the second reciprocating circulation water pipe outside the first reciprocating circulation water pipe from the in-vehicle fuel cell system to the fuel cell system, and an electric wire pipe surrounding an outer periphery of the second reciprocating circulation water pipe, the electric wire pipe being provided with one or more electric wires outside the second reciprocating circulation water pipe.

2. The multi-cylindrical structure supply pipe according to claim 1, further comprising a first reinforcement layer made of a first metal material, the first reinforcement layer being provided between the hydrogen supply pipe and the first reciprocating circulation water pipe.

3. The multi-cylindrical structure supply pipe according to claim 2, further comprising a second reinforcement layer made of a second metal material, the second reinforcement layer being provided between the first reciprocating circulation water pipe and the second reciprocating circulation water pipe.

4. The multi-cylindrical structure supply pipe according to claim 3, wherein the second metal material is a material different from the first metal material and has electric resistance higher than electric resistance of the first metal material.

5. The multi-cylindrical structure supply pipe according to claim 3, wherein the second reinforcement layer includes metal wiring embedded therein, the metal wiring being configured to receive a predetermined current to provide a temperature regulating function to inhibit freezing of liquid in the first reciprocating circulation water pipe.

6. The multi-cylindrical structure supply pipe according to claim 5, wherein the first reciprocating circulation water pipe is configured to communicate with an inflow port of a heat exchanger provided in the fuel cell vehicle, wherein the second reciprocating circulation water pipe is configured to communicate with an outflow port of the heat exchanger, and wherein the heat exchanger is configured to (i) receive the liquid from the first reciprocating circulation water pipe, (ii) perform heat exchange between the received liquid and a fuel cell stack of the in-vehicle fuel cell system, and (iii) discharge the liquid after the heat exchange to the second reciprocating circulation water pipe.

7. The multi-cylindrical structure supply pipe according to claim 5, wherein the second reinforcement layer includes a heat insulating layer, the heat insulating layer being made of a resin material having a heat insulating property.

8. The multi-cylindrical structure supply pipe according to claim 7, wherein the first reciprocating circulation water pipe is configured to communicate with an inflow port of a heat exchanger provided in the fuel cell vehicle, wherein the second reciprocating circulation water pipe is configured to communicate with an outflow port of the heat exchanger, and wherein the heat exchanger is configured to (i) receive the liquid from the first reciprocating circulation water pipe, (ii) perform heat exchange between the received liquid and a fuel cell stack of the in-vehicle fuel cell system, and (iii) discharge the liquid after the heat exchange to the second reciprocating circulation water pipe.

9. The multi-cylindrical structure supply pipe according to claim 1, wherein the first reciprocating circulation water pipe is configured to communicate with an inflow port of a heat exchanger provided in the fuel cell vehicle, wherein the second reciprocating circulation water pipe is configured to communicate with an outflow port of the heat exchanger, and wherein the heat exchanger is configured to (i) receive the liquid from the first reciprocating circulation water pipe, (ii) perform heat exchange between the received liquid and a fuel cell stack of the in-vehicle fuel cell system, and (iii) discharge the liquid after the heat exchange to the second reciprocating circulation water pipe.

10. A power supply system comprising:

a stationary fuel cell system that is stationary;

a fuel cell vehicle comprising an in-vehicle fuel cell system; and a multi-cylindrical structure supply pipe configured to couple the stationary fuel cell system and the in-vehicle fuel cell system, and comprising:

a hydrogen supply pipe configured to allow hydrogen gas to flow through the hydrogen supply pipe;

a first reciprocating circulation water pipe surrounding an outer periphery of the hydrogen supply pipe, the first reciprocating circulation water pipe being configured to allow liquid to flow through the first reciprocating circulation water pipe outside the hydrogen supply pipe from the fuel cell system to the in-vehicle fuel cell system;

a second reciprocating circulation water pipe surrounding an outer periphery of the first reciprocating circulation water pipe, the second reciprocating circulation water pipe being configured to allow the liquid to flow through the second reciprocating circulation water pipe outside the first reciprocating circulation water pipe from the in-vehicle fuel cell system to the fuel cell system, and an electric wire pipe surrounding an outer periphery of the second reciprocating circulation water pipe, the electric wire pipe being provided with one or more electric wires outside the second reciprocating circulation water pipe.

11. The power supply system according to claim 10, wherein the multi-cylindrical structure supply pipe comprises a first reinforcement layer made of a first metal material, the first reinforcement layer being provided between the hydrogen supply pipe and the first reciprocating circulation water pipe.

12. The power supply system according to claim 11, wherein the multi-cylindrical structure supply pipe comprises a second reinforcement layer made of a second metal material, the second reinforcement layer being provided between the first reciprocating circulation water pipe and the second reciprocating circulation water pipe.

13. The power supply system according to claim 12, wherein the second reinforcement layer includes metal wiring embedded therein, the metal wiring being configured to receive a predetermined current to provide a temperature regulating function to inhibit freezing of liquid in the first reciprocating circulation water pipe.

14. The power supply system according to claim 13, further comprising: a control device configured to control application of the predetermined current to the metal wiring based on an external temperature.

15. The power supply system according to claim 14, wherein the fuel cell vehicle comprises a heat exchanger comprising (i) an inflow port configured to communicate with the first reciprocating circulation water pipe, and (ii) an outflow port configured to communicate with the second reciprocating circulation water pipe, wherein the heat exchanger is configured to (i) receive the liquid from the first reciprocating circulation water pipe via the inflow port, (ii) perform heat exchange between the received liquid and a fuel cell stack of the in-vehicle fuel cell system, and (iii) discharge the liquid after the heat exchange to the second reciprocating circulation water pipe via the outflow port.

16. The power supply system according to claim 10, wherein the fuel cell vehicle comprises a heat exchanger comprising (i) an inflow port configured to communicate with the first reciprocating circulation water pipe, and (ii) an outflow port configured to communicate with the second reciprocating circulation water pipe, wherein the heat exchanger is configured to (i) receive the liquid from the first reciprocating circulation water pipe via the inflow port, (ii) perform heat exchange between the received liquid and a fuel cell stack of the in-vehicle fuel cell system, and (iii) discharge the liquid after the heat exchange to the second reciprocating circulation water pipe via the outflow port.

* * * * *